US012664321B2

(12) United States Patent
Fang et al.

(10) Patent No.: US 12,664,321 B2
(45) Date of Patent: Jun. 23, 2026

(54) ELECTRONIC SYSTEM OF PUF-BASED ROOT KEY ENTANGLEMENT WITH MULTIPLE DIGITAL INPUT SEQUENCES AND ROOT KEY EXTRACTOR

(71) Applicant: Intelligent Information Security Technology Inc., Hsinchu (TW)

(72) Inventors: Wai-Chi Fang, Hsinchu (TW); Nicolas Jean Roger Fahier, Hsinchu (TW); Meng-Ting Wan, Hsinchu (TW)

(73) Assignee: INTELLIGENT INFORMATION SECURITY TECHNOLOGY INC., Hsinchu City (TW)

( * ) Notice: Subject to any disclaimer, the term of this patent is extended or adjusted under 35 U.S.C. 154(b) by 84 days.

(21) Appl. No.: 18/749,623

(22) Filed: Jun. 21, 2024

(65) Prior Publication Data

US 2025/0005206 A1 Jan. 2, 2025

Related U.S. Application Data

(60) Provisional application No. 63/523,988, filed on Jun. 29, 2023.

(51) Int. Cl.
*G06F 21/72* (2013.01)
*G06F 21/60* (2013.01)

(52) U.S. Cl.
CPC ............ *G06F 21/72* (2013.01); *G06F 21/602* (2013.01)

(58) Field of Classification Search
CPC ... G06F 21/72; G06F 21/602; H04L 2209/12; H04L 9/0822; H04L 9/0869; H04L 9/0894; H04L 9/3242; H04L 9/0866; H04L 9/0861; H04L 9/14; H04L 9/3278
See application file for complete search history.

(56) References Cited

U.S. PATENT DOCUMENTS

2018/0270014 A1* 9/2018 Muratani .............. H04L 9/0866
2021/0273790 A1* 9/2021 Suzuki ................. H04L 9/0866
2024/0195640 A1* 6/2024 Lindskog ............. H04L 9/0866

* cited by examiner

*Primary Examiner* — Sangseok Park
(74) *Attorney, Agent, or Firm* — HDLS IPR SERVICES; Chun-Ming Shih

(57) ABSTRACT

The present invention discloses a system for entangling multiple root keys with multiple arbitrary user-defined and self-generated input data using a Physically Unclonable Function (PUF) and a proposed digital algorithmic system. The key innovation lies in the combination of a PUF-based dynamically measurable entropy source and the proposed invention, enabling the generation of multiple true random keys. These keys serve as a secure foundation for establishing cryptographic channels, allowing the creation of isolated secure channels for different stakeholders and applications. The ability to create isolated secure channels with multiple root keys enables the establishment of multiple roots of trust, enhancing the integrity and security of cryptographic operations. The invention finds applications in various domains, such as FIDO authentications, point-to-point encryptions, crypto wallets, and encryption key management systems.

10 Claims, 8 Drawing Sheets

ELECTRONIC SYSTEM OF PUF-BASED ROOT KEY ENTANGLEMENT WITH MULTIPLE DIGITAL INPUT SEQUENCES AND ROOT KEY EXTRACTOR

CROSS REFERENCE TO RELATED APPLICATIONS

The present application claims the benefit of U.S. Provisional Patent Application No. 63/523,988 filed on Jun. 29, 2023, the contents of which are incorporated herein by reference in their entirety.

TECHNICAL FIELD

The present invention is related to information security, and more particularly to a digital circuit of a method to digitally entangle a single root key obtained from a physically unclonable function (PUF) with multiple digital input external to the PUF system.

BACKGROUND

The use of PUF circuitry in prior art is aiming at creating, update or retrieve a unique true random digital sequence referred most often as root key of a certain bit length. The root key is created and retrieved based on the true random behavior of a source of entropy composed of several entropy source elements, each element exhibiting unpredictable binary state output behavior due to semiconductor process nanoscale variations. The source of entropy therefore has a certain static entropy behavior and a certain dynamic entropy behavior, static entropy so as to converge to the successful creation and retrieval of a unique root key, dynamic entropy so as to successfully create true random numbers for security functions purposes.

In prior art, the stativity of the source of entropy is not entirely stable and needs further computation engine, a fuzzy extraction computation engine to extract the unique root key using digital correction with the help of particular checkpoint data, also referred as helper data. The helper data are created during the creation of the unique root key and are used as input of the fuzzy extraction computation engine to correct the variations from the random source of entropy, so as to always retrieve the correct root key every time. The helper data are not sensitive data by themselves and can be stored outside the secure boundaries of the device, the helper data are only usable and coherent with a particular source of entropy that remains within the hardware secure boundaries.

A major defect in related prior art comes from the real circuit implementation constraints of such systems that induce limitations in the ability to involve PUF-based root keys with the user and/or the custom application direct inputs. Indeed, the helper data are relatively lengthy compared to what could be a strong password or digital token, usually limited to 32 or 64 bytes' sequence. Devices using such PUF systems to obtain one or several root keys integrate the storage of these helper data to avoid requesting the user or the application to manage and load these lengthy data themselves. Therefore, the user and/or the application using a root key has no solution to entangle a specific PUF root key with an additional digital input, typically a system password or a digital token, and any such desirable secure access credential will have to be subject to an external secure module verification or authentication outside the scope of the PUF, the latest being the most secure component of a trusted intrinsic system and by consequent the optimal subsystem to feed a user and/or an application custom input for direct locking and unlocking mechanism of a specific root key.

In order to overcome the disadvantages and provide useful entanglement of user and/or application custom input for a particular root key, so as to establish system such as storage-free password PUF verification or token PUF authentication directly, it is necessary to design a PUF root key creation and retrieval structure that can allow additional digital inputs, in addition to the existing helper data, so as to extend the potential applications and reach of PUF systems for electronics security at every level from the root functions, such as secure boot and firmware protection, to the running secure application such as password verification of multiple factor authentication.

SUMMARY

In the view of this, the present invention introduces a system and a root key extractor for entangling multiple root keys and generating true random numbers using a Physically Unclonable Function (PUF) and a proposed digital algorithmic system. The invention provides advantages over existing PUF technologies, including the ability to create and recover multiple true random root keys and true random numbers independent from power cycles. These features enhance security, enable the establishment of isolated secure channels digital credentials, and offer flexibility in key management throughout the device lifecycle. The invention is compatible with existing electronic devices and can be integrated with minimal design modifications.

In the present disclosed invention, a system is provided for entangling multiple root keys with multiple arbitrary user-defined and self-generated input data. The invention utilizes a Physically Unclonable Function (PUF) and a proposed digital algorithmic system to achieve this entanglement.

To achieve the aforementioned objectives, the present invention provides an electronic system to create and recover a multitude of intrinsic unique digital sequences, referred as root keys, with multiple input source both internal and external to the host system, and feeding the input of a cryptographic service module. The electronic system comprises a physically unclonable function input source, a root key extractor, a set of cryptographic digital inputs, a set of helper data, and a cryptographic services module. Firstly, the physically unclonable function input source, designed to output a different bit stream PUF Raw Data after each different measurement requests that can be requested independently from power cycle at any given time. Secondly, the root key extractor that will produce both the root keys and associated digital helper data in an enrollment mode, add new associated digital helper data in accordance with new user input to entangle root key with in an update mode, and recover the generated root keys using adequate valid inputs and PUF raw data. Furthermore, the set of cryptographic digital inputs, referred as tokens, that can be established through various sources, stored or volatile, and corresponding to a certain bit length of digital sequences, accessed by the root key extractor. Additionally, the set of helper data, each section associated with a particular root key and one or more arbitrary user-defined input, accessed by the root key extractor; and the cryptographic services module that will use as input the root keys created or recovered by the root key extractor.

In an embodiment of the present invention, the input of the root key extractor comprises: a certain number of bit stream from a source of PUF raw data that will be used for generating true random numbers, and an original true random root key; a digital input sequence from the set of arbitrary user-defined digital inputs, that can take any bit length and be from various sources; a particular section of stored helper data generated during the root key enrollment process or updated during the update process and used as input during the root key recovery or update process, entangled with a particular user-defined digital input; and a locally or externally stored specific helper data section.

To achieve the aforementioned objectives, the present invention provides a root key extractor, to extract several unique intrinsic digital root keys with several non-random and random digital inputs, and producing both digital outputs and its own digital inputs helper data. The root key extractor comprises: a key extractor controller, a key derivation function unit, a true random number generator, a Fuzzy extractor, a message authentication code unit, a format preserving encryption unit, and a memory storage. Firstly, the key extractor controller that is a digital circuit in charge of managing the system input and output message, as well as controlling the sequence and operation flow of data between each unit composing the root key extractor. Secondly, the key derivation function unit that will produce a unique random key used to encrypt a specific root key generated by the true random number generator during enrollment, and takes as input a user-defined digital input, true random numbers and a discrete measured version of the PUF source data, different at each measurement. Furthermore, the true random number generator that will use a certain number of input from the PUF source and produce as much true random numbers as required by the system, generating original root keys and creating random vectors used in helper data for root key recovery process. Additionally, the Fuzzy extractor that can produce a specific vector from a version of PUF raw data during the enrollment procedure, and use the latest specific vector to correct a new version of PUF source data into the initial one measured and used during the enrollment to create a root key. Moreover, the message authentication code unit that generates vectors that serve to validate a certain key based on a certain bit stream value from the PUF source, the bit stream from the PUF source coming directly from the PUF Source during enrollment, and coming from the Fuzzy extractor correction mechanism during the recovery. Additionally, the format preserving encryption unit that will be used a symmetrical encryption and decryption unit, encrypting the root key in helper data during the enrollment process and decrypting the root key for output after validation of successful recovery by the message authentication code unit; and a memory storage that will be used in writing operation mode during the enrollment process and in reading in recovery mode, wherein it stored digital values created by the fuzzy extractor, format preserving encryption unit, true random number generator and message authentication code unit. Furthermore, the root key extractor operates in an enrollment mode to generate a root key based on inputs; in a recovery mode to recover the original generated root key based on identical predictable digital inputs and different unpredictable digital inputs from a PUF source with certain amount of bit variations; and in an update mode combination of the enrollment mode and the recovery mode to add additional root key digital input entanglement.

In first aspect of the invention, its ability to generate multiple true random keys and true random numbers, independent from power cycles and not fixed for the entire device lifecycle. This feature provides significant advantages over existing PUF technologies, which often rely on power cycles or generate a single fixed root key. By enabling the creation and recovery of multiple true random root keys.

In second aspect of the invention, unlike traditional PUF technologies that generate a single root key during device initialization, the invention allows for the generation of multiple root keys that are not mathematically related to a key derivation function (KDF). This ensures enhanced security by reducing the risk of key compromise and enabling the creation of isolated secure channels for different stakeholders and applications.

The dynamic nature of the disclosed PUF system provides additional advantages. It allows for the continuous generation of true random numbers, facilitating the generation of fresh encryption keys, nonces, or other cryptographic parameters as needed. This eliminates the reliance on fixed or pre-generated random number seeds and enhances the overall security posture. Furthermore, the ability to generate multiple true random keys enhances the integrity and security of cryptographic operations allows for the creation of isolated secure channels digital credentials for different stakeholders and applications, facilitating the establishment of multiple roots of trust. This feature significantly strengthens the overall security posture and enables secure communication and authentication in various domains, including FIDO authentications, point-to-point encryptions, crypto wallets, and encryption key management systems.

Furthermore, the flexibility to update and change root keys throughout the device lifecycle adds another layer of security. In contrast to PUF technologies with fixed root keys, the disclosed invention allows for the rotation of root keys as required, mitigating the impact of key compromises or algorithm vulnerabilities. The integration of the disclosed invention is straightforward, requiring minimal design modifications, designed to be compatible with standard processor units such as CPUs, MCUs, and GPUs, reducing integration costs and facilitating widespread adoption. It can be seamlessly integrated into existing electronic devices without incurring significant additional costs or complexities.

DETAILED DESCRIPTION

Figure 1:
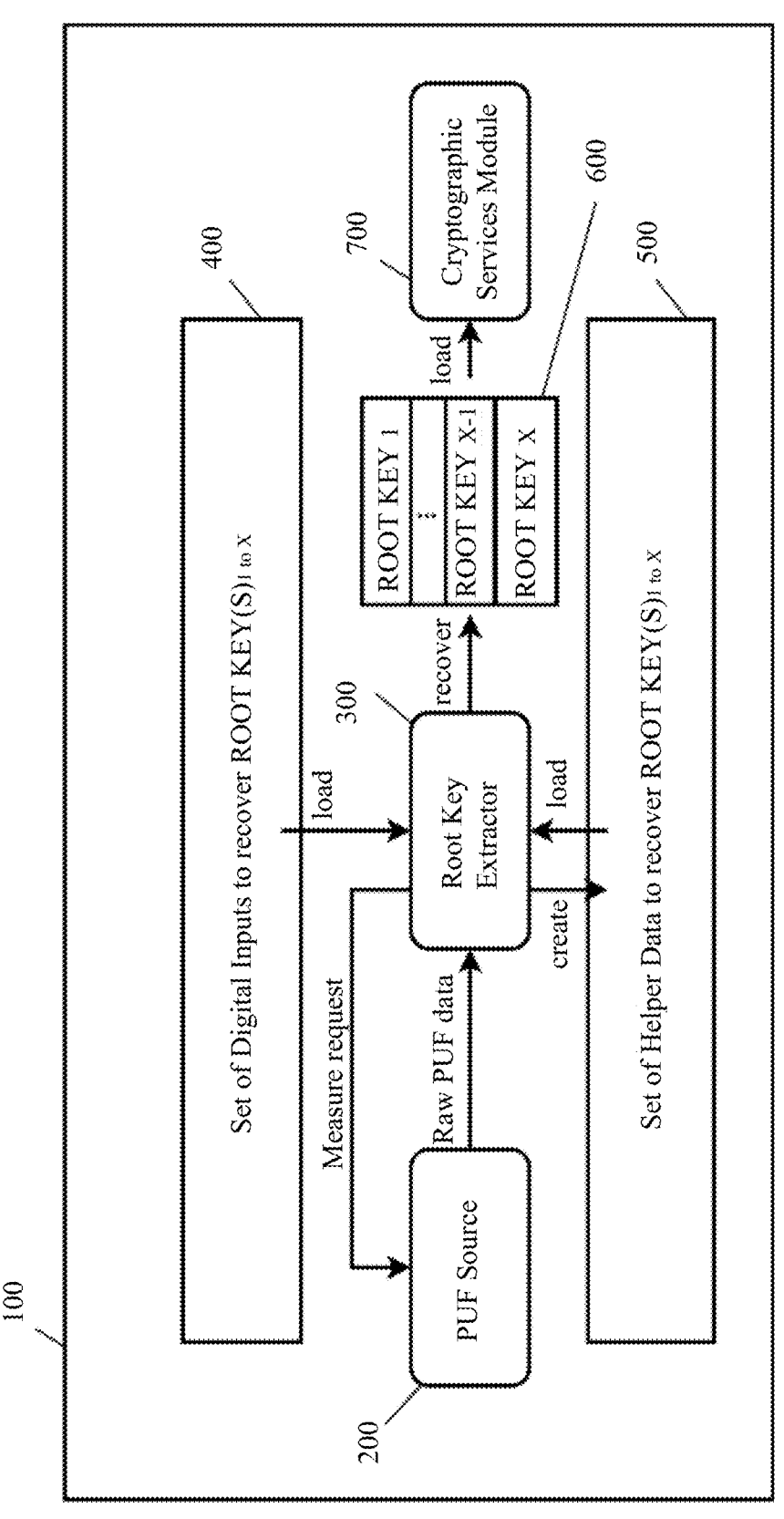
FIG. 1 is a schematic diagram of electronic system integrating cryptographic functions, fuzzy extractor and a physically unclonable function entropy of the present invention.

The present disclosure describes an electronic system and a root key extractor capable of creating and managing dynamically multiple unique and intrinsic digital root keys based on several both internal and external fixed and random inputs sources, root keys that will serve as the base secure input to a cryptographic services module including certain standardized cipher suite.

The main goal of a PUF system is to retrieve a unique static digital sequence, used as a root digital identity, also referred in this disclosure as root key, from a source of randomness, or source of entropy, that will inhibit any possible prediction while giving suitable input for a PUF system to use it and extract from it a unique digital sequence and random numbers.

A cryptographic service module is usually composed of a key exchange algorithm, authentication algorithm, encryption and message authentication code algorithm, such as ECDH, ECDSA, AES, RSA, SHA but not limited to.

An integrated PUF system mechanism able to retrieve digital unique sequences intrinsic to a single silicon manufactured system, PUF source of entropy, will be able to source these algorithms and security protocols with unpredictable unique sequences, never known by the manufacturer, the designer or the user, which already prevents database cyberattacks that currently have these unique identifiers required to be stored and set by human or machine fixed intervention.

Intrinsic retrievable unique digital identities can be used for authentication mechanisms, network identifications or input bias for message authentication algorithms, usually referred as salt. Indeed, the required cipher suite to deploy secure electronic environment are standardized and fixed, therefore electronics designers are required to implement uniqueness manually or intrinsically with PUF to render the behavior of these standards unique.

In this disclosed invention, a dynamic system to provide a source of entropy for both PUF mechanism and random number generator is described and integrated with a single semiconductor CMOS technology, allowing for the generation of multiple true random root keys and true random numbers, which enables the entanglement of multiple root keys with multiple arbitrary user-defined and self-generated input data using a Physically Unclonable Function (PUF) and a proposed digital algorithmic system.

The disclosed system is able to provide a reliable and dynamically measurable source of entropy independently from the electronic device power cycle, ensuring the availability of true random numbers anytime without relying on pseudo-random number generators, ensuring the generation of multiple true random keys that serve as a secure foundation for establishing cryptographic channels.

The current state-of-the-art PUF technology often relies on a one-time operation during the power cycle or a single triggered enrollment sequence, limiting its flexibility and adaptability. Existing PUF technologies often depend on the power cycle, can only generate a single root key, or cannot update and change the root key during the device lifecycle. They may also be limited in their ability to generate multiple true random numbers that are not mathematically related to a key derivation function (KDF), even if deemed secure enough by established international standards.

The uniqueness of the present invention resides in its ability to be used and reused independently from any other systems or power-up sequence, without causing design restrictions for the host electronic system. The present invention only requires a single semiconductor CMOS process manufacturing and can be seamlessly integrated within any standard processor units (CPU, MCU, GPU) or custom ASIC systems without additional design costs, serving as a plug and design integrated subsystem.

The dynamic feature of the present invention makes it an independent subsystem that can be integrated into existing electronic devices without the need for intrinsic design modifications, significantly reducing the cost associated with the development of new integrated circuits, notably CPUs, MCUs, and GPUs. This flexibility allows for easy adoption and deployment of the proposed PUF system., allowing it to be an independent subsystem that can be integrated into existing electronic devices without the need for intrinsic design modifications, significantly reducing the cost associated with the development of new integrated circuits, especially for CPUs, MCUs, and GPUs.

Traditional PUF system enrollment and recovery systems are designed enrollment and recovery systems that may involve the self-injection of root keys with OTP-PUF and/or the use of common error-correcting codes (ECC) typically with SRAM-PUF, which can introduce limitations in terms of flexibility and scalability.

Please refer to FIG. 1, the present invention provides an electronic system 100 for generating multitude of root keys 600 indexed from 1 to X, the electronic system 100 comprising a dynamically measurable PUF input source, also simply referred as PUF input source 200, a root key extractor digital processing system 300, referred as root key extractor, the latest creating the set of root keys 600 associated helper data 500 and taking as additional cryptographic digital inputs 400 also referred as input tokens, and a cryptographic services module 700.

The PUF input source 200 is designed to output a different bit stream PUF raw data after each different measurement requests that can be requested independently from power cycle at any given time. Further, the physically unclonable function input source and associated with measurement digital trigger are from multiple physically source, with the sole requirement to be of an identical physical source when associated with one or more root key generated or recovered.

The root key extractor 300 has locally access to one or more indexed non-volatile memory via standard serial and, or bus peripheral communication protocols. The root key extractor 300 operates in root key enrollment mode without using any user-defined input but a system-defined hardcoded one, and create root key associated helper data 500 indexed section in accessible non-volatile memory. Further, the root key extractor 300 operates in root key recovery mode using a user-defined input, and create root key associated helper data 500 indexed section in accessible non-volatile memory. Additionally, the root key extractor operates in root key update mode using a user-defined input, and append new a chunk of recovery data to the root key associated helper data indexed section in accessible non-volatile memory. Moreover, the root key extractor 600 operates in any mode associated with a root key and obtained raw data from a different physically unclonable function than the one that have been used for one other and many other root key extractor 300 operation modes.

The root key extractor 300 is tasked to initiate a measurement trigger request on the PUF input source 200, defined in a way that makes it dynamically measurable on trigger requests via an internal digital transmission link. Upon a measure request from the root key extractor 300, the PUF input source 200 output the current measured data from its PUF cell 230 array structure, referred as PUF raw data on FIG. 1 and as E in FIG. 2. In another embodiment, PUF input source 200 is measurable dynamically on a third-party digital controller. The root key extractor 300 is a digital hardware circuitry design or is a software program, or the root key extractor 300 is a combination of both hardware circuitry and software designs. It is assumed and necessary that the root key extractor 300 is able to trigger new measure request on the PUF input source 200 at any given time, hence obtaining a new version of PUF raw data E after each request, each time different with a certain static entropy and dynamic entropy both compatible with the generation of true random number and the successful enrollment and/or recovery of root keys 600.

The PUF raw data from the PUF input source 200 may be delivered in various order, not limited to a particular array units' order, such as by single bit transmission of each PUF cell 230, by cy dimension vectors of each PUF cell row 210, by rx dimension vectors of each PUF cell columns 220, by a logic combination of both, or by partially complete PUF raw data E. The measure request can further be designed to be a digital instruction multiple measure requests including or not instructions on specific raw data output formats.

The root key extractor 300 loads and/or reads a targeted or indexed digital input, also referred as token to be associated with a targeted or indexed, from 1 to X, root key, where X is the total number of root keys currently being managed by the system. These digital inputs may be defined by external digital systems, user-defined, hardcoded within the system, or eventually from other PUF-based entities. The root key extractor 300, uses a loaded specific digital input 411 in FIG. 4A, also referred as token, and will operate a cryptographic entanglement of this particular input during the enrollment of a new root key X with the latest. During the enrollment, also known as root key creation, of a new root key 600, the root key extractor 300 will generate specific helper data 511 in FIG. 5A, entangled as well with the loaded digital input 411. At last for a single root key 600, the root key extractor takes a set of PUF raw data, E on FIG. 2, series of measurements, and a digital input or token $X_n$ to create or enroll a true random new root key X and generate associated helper data $X_n$. Using a new PUF raw data series of measurements, the same digital input X used to enroll the root key X, the generated helper data $X_n$ for this particular root key X, the root key extractor is able to recover and converge toward a unique and stable root key X.

Further, a set of cryptographic digital inputs 400 that can be established through various sources, stored or volatile, and corresponding to a certain bit length of digital sequences, accessed by the root key extractor 300. The cryptographic digital inputs 400 are stored entirely in local memory storage; alternatively, the cryptographic digital inputs 400 are partially stored or not in local memory storage. Additionally, one or more cryptographic digital inputs from a set of cryptographic digital inputs are hardcoded within the digital design of the electronic system; alternatively, one or more cryptographic digital inputs from a set of cryptographic digital inputs are volatile inputs externally sourced outside the electronic system. The set of helper data, each section associated with a particular root key and one or more arbitrary user-defined input, accessed by the root key extractor.

In some embodiments of the present invention, the digital inputs are further index from $X_1$ to $X_n$. Indeed, not only the root key extractor 300 is able to generate multiple root key 600 indexed X but is as well capable of defining multiple digital inputs able to be used to recover the same root key X 600. Therefore, once a root key X 600 has been recovered, the root key extractor 300 will be able to generate new specific helper data 511 to match with a new digital input 411 while recovery the same root key X 600, hence the definition of n in FIG. 4A and FIG. 5A, the number of different digital input X and associated specific helper data 511 capable of recovering a root key 600 indexed X. For example, root key 3 could be recoverable using digital input $3_1$ with helper data $3_1$, but as well digital input $3_2$ with helper data $3_2$, if two digital input $3_1$ and $3_2$ are defined to be able to load and recover the root key 3. In the latest example for root key 3 we have n=2. There will be by consequences an identical number of digital input $X_n$ and specific helper data $X_n$ 511 for one root key X 600. Since the indexes X of root keys is variable, the indexes n may be different for each index X.

Each root key X 600 remains revocable at any time if a new enrollment procedure is launched for a root key index X 600 that already exists. Should the associated digital inputs $X_n$ remain all identical, partially identical or entirely new, every new root key X 600 will be a new true random number guaranteed by new random variations within the new PUF input source 200 PUF raw data measure requests. The newly generated associated specific helper data $X_n$ 511 will also all be newly random even though the digital inputs $X_n$ 411 may not.

At last, each root key X 600 is used as current root key for cryptographic services module 600. The cryptographic services module 700 may include all or some of the standardized ciphers, as well as proprietary ciphers, standardized secure protocols and as well as proprietary protocols. The cryptographic services module 700 that will use as input the root keys created or recovered by the root key extractor. The cryptographic services module 700 is a digital hardware circuitry design composed of cryptographic algorithms. In one embodiment, the cryptographic services module is a software program design composed of cryptographic algorithms. In another embodiment, the cryptographic services module is a combination of both hardware circuitry and software designs.

The electronic system 100 described in FIG. 1 operates under power supply but is completely independent from the power-up and power-off cycles of the host device integrating the present invention as a sub-system.

Figure 2:
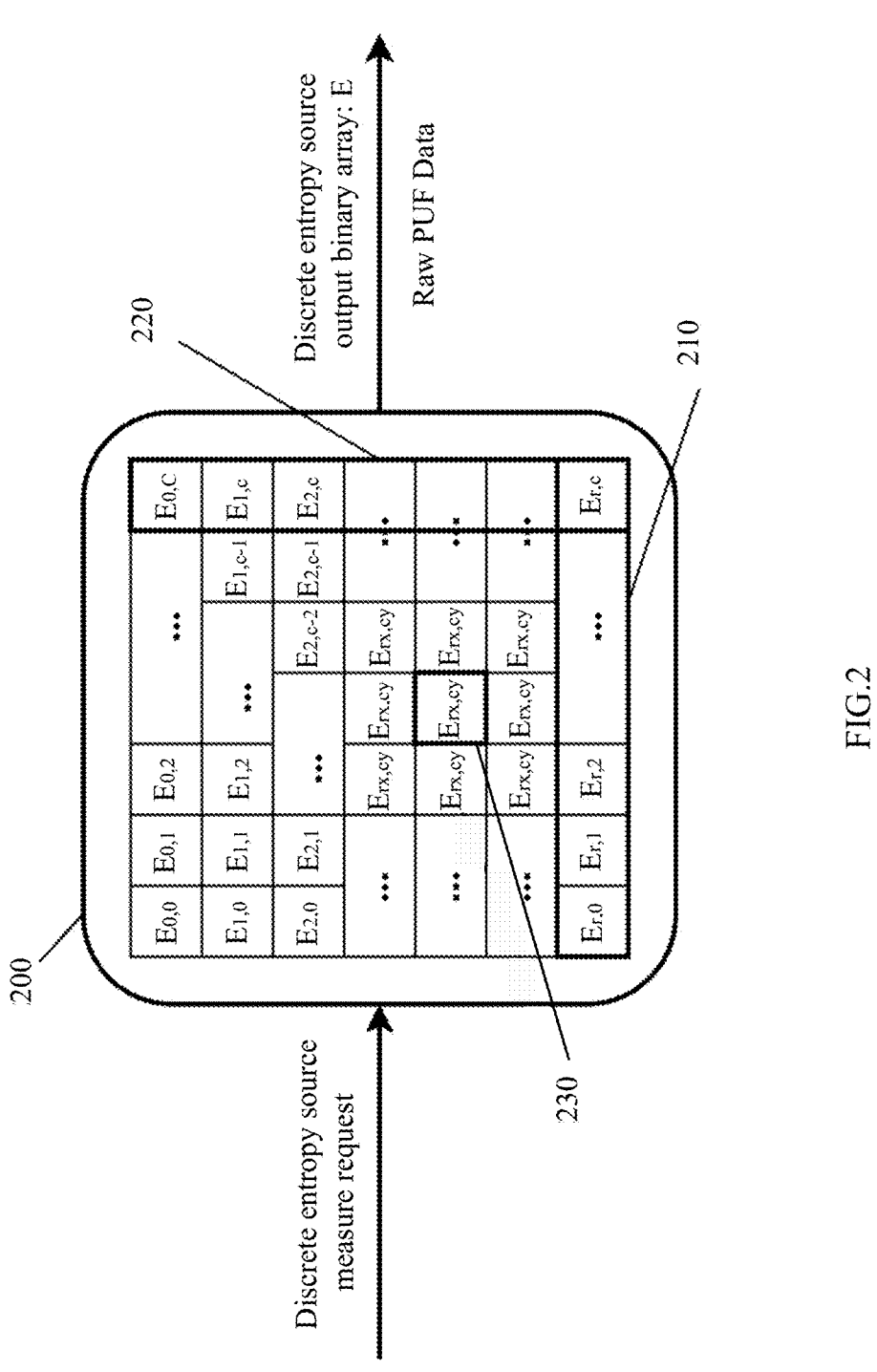
FIG. 2 is a schematic diagram of an array structure of physically unclonable function cell units of the present invention.

Please refer to FIG. 2, where the system and architecture design of the PUF input source 200 of FIG. 1 is further described and comprises an array of PUF cells 230 $E_{rx, cy}$ arranged in rows 210 and columns 220, where rx is an integer number of rows, cy an integer number of columns of minimum respective values of 2 and unrestricted maximum values. Each PUF cell 230 is measurable based on a digital triggering measuring signal, independent from power cycles, and converge toward an unpredictable binary level, either low or high corresponding to the current system logic-level '0' or '1'. The PUF input source 200 of PUF cells 230 where the full array of binary data E of dimension (rx, cy) is the PUF raw data input of root key extractor 300 in FIG. 1 and can be collected row by row 210 or column by column 220, with a certain logic-gates circuit design counting and/or accumulating process.

Figure 3A:
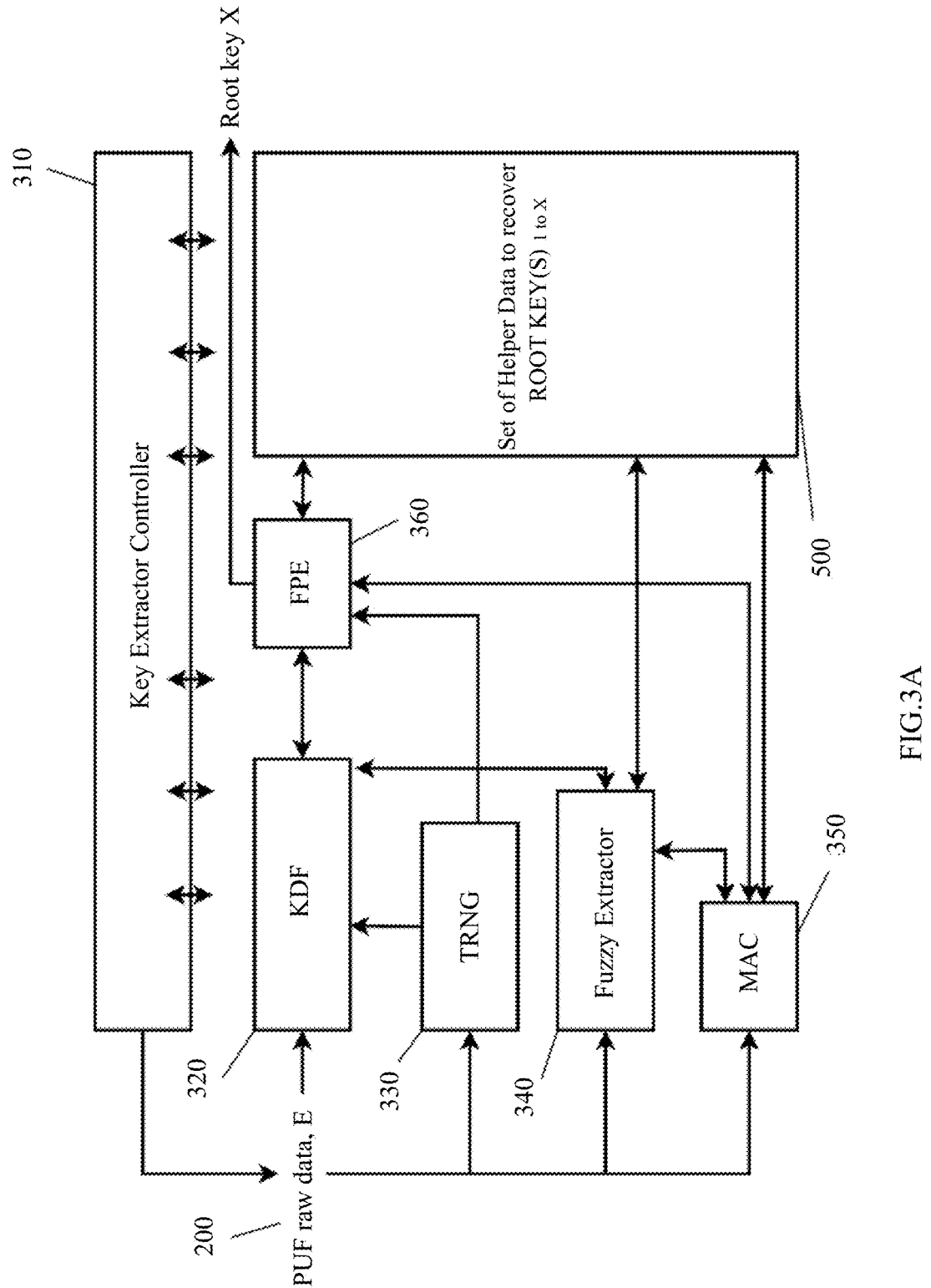
FIG. 3A is a schematic diagram of the system architecture and communication paths between each subsystem of the root key extractor of the present invention.

Please refer to FIG. 3A, describing detailed implementation of root key extractor 300 in FIG. 1 where the root key extractor 300 performs the key enrollment function and recovery function. The root key extractor 300 is configure to extract several unique intrinsic digital root keys with several non-random and random digital inputs, and producing both digital outputs and its own digital inputs helper data. The key enrollment function generates the specific helper data 511 for key recovery entangled with digital input 411, and the recovery function recovers the corresponding root key 600 based on the specific helper data 511 and correct digital input 411.

The root key extractor 300 is composed of a key extractor controller 310, a key derivation function (KDF) 320, a true random number generator (TRNG) 330, a fuzzy extractor 340, a message authentication code (MAC) unit 350, and a format preserving encryption unit 360, loading the digital inputs 411 via the key extractor controller 310 and writing and reading the specific helper data 511 from a memory storage 501. The key extractor controller 310 that is a digital circuit in charge of managing the system input and output message, as well as controlling the sequence and operation flow of data between each unit composing the root key extractor 300. The memory storage 501 for accessing a set of helper data 500 that will be used in writing operation mode during the enrollment process and in reading in recovery mode, wherein it stored digital values created by the fuzzy extractor 340, the format preserving encryption unit 360, true random number generator 330 and message authentication code unit 350.

The key derivation function 320 operates the key derivation with the input key of a bit sequence of arbitrary length and multiple bit sequences of arbitrary length, and the output bit sequence of arbitrary length as the derived key, which can be implemented by the standard KDF algorithm or any other methods. The key derivation function unit 320 that will produce a unique random key used to encrypt a specific root key 600 generated by the true random number generator during enrollment, and takes as input a user-defined digital input, true random numbers and a discrete measured version of the PUF source data, different at each measurement.

True random number generator 330 extracts multiple input entropy from processing random bits input from the PUF raw data, E, provided by the PUF input source 200, and outputs true random numbers. The true random number generator 330 that will use a certain number of input from the PUF source and produce as much true random numbers as required by the system, generating original root keys 600 and creating random vectors used in helper data for root key 600 recovery process.

The fuzzy extractor 340 operates in either enrollment mode or recovery mode. When operating in enrollment mode, the input is a bit sequence of arbitrary length, and the output is a set of helper data 510; this input bit sequence E from PUF input source 200 is referred to as the original bit sequence corresponding to the output specific helper data 511. The fuzzy extractor 340 that can produce a specific vector from a version of PUF raw data during the enrollment procedure, and use the latest specific vector to correct a new version of PUF source data into the initial one measured and used during the enrollment to create a root key 600.

When operating in recovery mode, the input is a bit sequence from PUF input source 200, different than the original bit sequence that generated the associated specific helper data 511, and the output is the original bit sequence that generated the specific helper data 511, wherein the new input bit sequence has the same length as the original bit sequence. The original bit sequence is associated with the generated specific helper data 511, and is a bit sequence that is similar to the new bit sequence, wherein 'similar' is defined as having a proportion of bits that are different between the two bit sequences.

This Fuzzy Extractor 340 uses specific helper data 511 corresponding to the original bit sequence to repair the new bit sequence similar to the original bit sequence. It can be implemented using any error correction technique, such as error correction codes, or any method that can achieve the same functionality.

The message authentication code unit 350 that generates vectors that serve to validate a certain key based on a certain bit stream value from the PUF source, the bit stream from the PUF source coming directly from the PUF Source during enrollment, and coming from the Fuzzy extractor correction mechanism during the recovery. Further, the message authentication code 350 operates in both signing mode and verifying mode. When operating in signing mode, the input is a bit sequence of arbitrary length as a message and a bit sequence of arbitrary length as a key, and the output is the bit sequence generated by the input message and input key pair as the authentication code. When operating in verifying mode, the inputs are a bit sequence of arbitrary length treated as a verification message, a bit sequence of arbitrary length treated as a verification key, and an authentication code. If and only if the input verification message and the verification key pair are identical to the message and key pair that created the authentication code, the verification succeeds in confirming the correctness or integrity of the verification message and outputs a verification message; otherwise, the verification fails, and no message is output.

The format preserving encryption unit 360 is an encryption or decryption function wherein input is a bit sequence of arbitrary length as a key, a bit sequence of arbitrary length as data, and output is the result of encrypting or decrypting the input data using the input key which is a bit sequence of the same length as the input data. The format preserving encryption unit 360 that will be used for encrypting the root key 600 in helper data 500 during the enrollment process and decrypting the root key 600 for output after validation of successful recovery by the message authentication code unit 350.

Figure 5A:
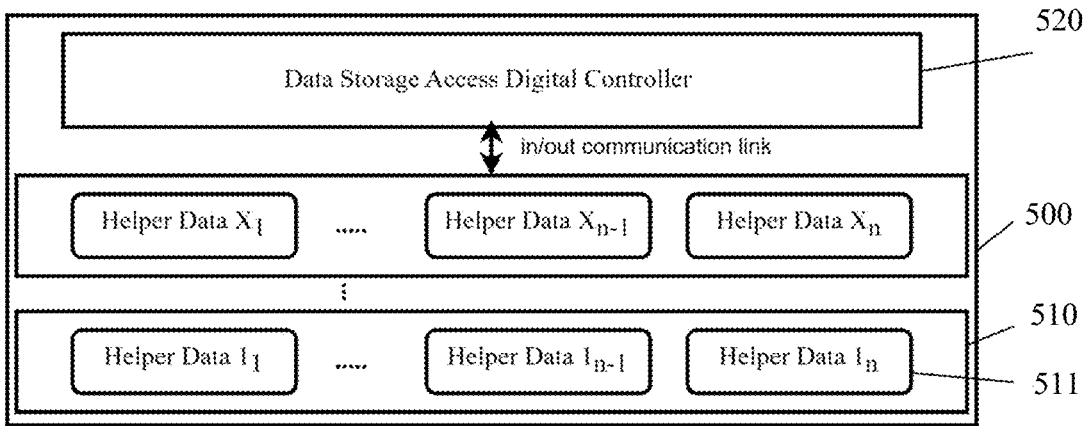
FIG. 5A is a schematic diagram of an arrangement of multitude of helper data created by the system described in FIG. 3A during the enrollment procedure of a root key as in FIG. 3B and/or during the update procedure as in FIG. 3D of the present invention.

The set of helper data 510 on FIG. 3A associated with the root keys X 600 to recover are arranged in a way so as to read and write data via a data storage digital access controller 520 described in FIG. 5A.

The key extractor controller 310 is a controller to manage and sequence the communication and data transmission between each sub-unit composing the root key extractor

300, including a key derivation function (KDF) 320, a true random number generator (TRNG) 330, a fuzzy extractor 340, a message authentication code (MAC) unit 350, and a format preserving encryption unit 360, loading the digital inputs 411 via the key extractor controller 310 and writing and reading the specific helper data 511 from the helper data 500.

Figure 4A:
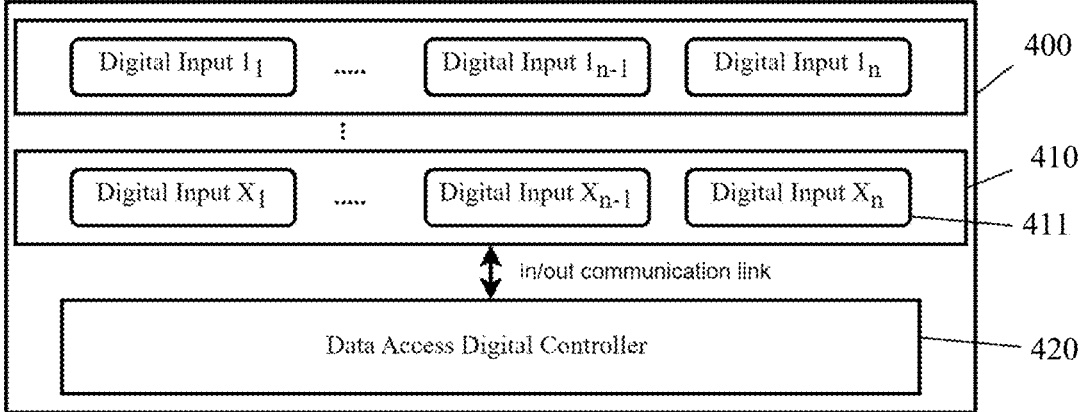
FIG. 4A is a schematic diagram of an arrangement of multitude of user-defined inputs, also referred as tokens, and their relationship with their indexed root keys accessed through a data access digital controller of the present invention.

Refer to FIG. 4A, which illustrates the management and source of X digital inputs 410 entangled with each root keys 600 with multiple digital inputs for cryptographic operations. The figure depicts a set of 'X' lines representing the X number of root keys, denoted as $X_1$ to $X_n$. Each line corresponds to a unique root key X 600, and it is entangled with a variable number of 'n' digital inputs that can activate the same root key X 600.

The entanglement process begins with the first digital input 411, $X_1$, which plays a crucial role in creating root key X 600. This initial digital input, which can originate from various sources such as user input, chip ID, application-specific numbers, or local memory, is used to establish the root key X 600 through cryptographic operations and error-correction of the PUF source data from PUF input source 200.

Once root key X is created, more digital inputs entanglement can be further made by incorporating additional digital inputs, $X_2$ to $X_n$, into the entanglement process with root key X 600, and will be associated with new specific helper data 511 with the same index $X_n$. These digital inputs 400 can have any bit size and are flexible in nature, allowing them to be changed at will. Similar to the first digital input, $X_1$, these subsequent digital inputs, $X_2$ to $X_n$, can originate from diverse sources and serve different purposes within the cryptographic system, 410 in FIG. 4A representing one set of valid digital input $X_n$ 410 able to recover root key X 600 associated with the set of helper data $X_n$ 510, $X_n$ being exactly the same double-indexed value. Therefore, the set of helper data 510 in FIG. 5A for a particular root key X 600 corresponds to the set of valid digital inputs $X_n$.410.

FIG. 4A also includes a data access digital controller 420. This block represents a digital access interface that efficiently facilitates access to the various sources of these digital inputs. The data access digital controller 420 acts as an interface to securely retrieve and incorporate the digital inputs, whether they are volatile inputs or non-volatile inputs, into the entanglement process. It provides a seamless and efficient means of communication between the cryptographic system and the sources containing the digital inputs.

FIG. 4A showcases the entanglement of root keys 600 with multiple digital inputs, enabling a robust and versatile cryptographic system. The root keys 600, represented by 'X' lines, are cryptographically entangled with a variable number of digital inputs 410, $X_1$ to $X_n$, which can be obtained from different sources and dynamically modified. The data access digital controller serves as a pivotal component in facilitating access to these digital inputs 410, ensuring the secure and efficient operation of the cryptographic system.

Refer to FIG. 5A, which illustrates the storage and retrieval of specific helper data $X_n$ 511 corresponding to each digital input $X_n$ 411 and root key X pair 600. The figure showcases the integration of non-volatile memory, that may be both on-chip and off-chip, to store the helper data $X_n$ 510 required for the activation and recovery of specific root key X.

Each digital input 411, indexed as $X_n$, is associated with a corresponding root key X 600, and specifically generated specific helper data 511 with the same index $X_n$. Therefore, in addition to the Digital inputs $X_n$ 410, there exists a set of helper data 510, denoted as helper data $X_n$, that complements each 411 digital input $X_n$ and root key X pair 600. Unlike the digital inputs 411, which can be modified and originate from various sources, the specific helper data 511 are generated by the root key extractor 300 and kept in non-volatile memory and needs to be stored in a reliable manner, however not constituting a particular security breach if known to public without all the knowledge of specific digital values of the entire digital input sources of the present invention.

The storage and retrieval of the Helper data are facilitated by the root key extractor 300 via data storage access digital controller 520 to access various indexed specific helper data 511. The root key extractor 300 is responsible for the creation of the specific helper data $X_n$ 511 for each root key X 600 that should be activated by a specific digital input $X_n$ 411. The specific helper data 511 is computed based on cryptographic algorithms and is tailored to each root key X 600 and digital input $X_n$ 411 combination.

To ensure the accessibility of the helper data 510, non-volatile memory system should be employed. This non-volatile memory can be integrated either on-chip or off-chip, depending on the specific implementation requirements. The non-volatile memory securely stores the specific helper data 511, safeguarding it against power.

The helper data 510 and the data storage access digital controller 520 enables the efficient retrieval of the specific helper data $X_n$ 511 associated with each digital input $X_n$ 411 and root key X 600, facilitating the entanglement and recovery process of each targeted root key X 600.

FIG. 5A illustrates the integration of non-volatile memory for the storage and retrieval of helper data associated with each digital input and root key pair. The root key extractor 300 generates the specific helper data $X_n$ 511 for each root key X 600 and digital inputs $X_n$ 411. The non-volatile memory, either on-chip or off-chip, stores the Helper data, ensuring its availability for the entanglement and recovery process.

Figure 4B:
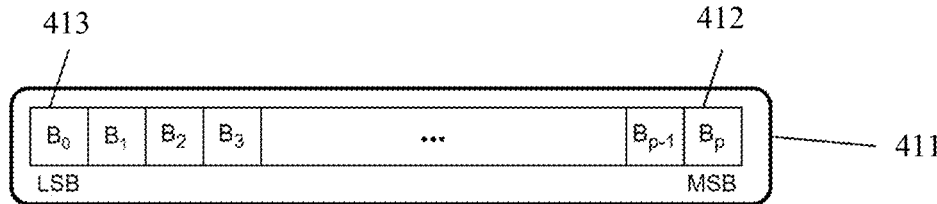
FIG. 4B is a schematic diagram of the arrangement of a single user-defined digital input or token in least significant bit mode first of the present invention.

Refer to FIG. 4B, which illustrates the digital inputs $X_n$ 411 in the least significant bit 413 (LSB) first mode. The figure demonstrates the digital sequence $X_n$, which can consist of any bit size 'p' and can be written or read in the LSB-first mode. The LSB-first mode indicates that the bits are transmitted or processed starting from the least significant bit 413 towards the most significant bit 512.

Figure 4C:
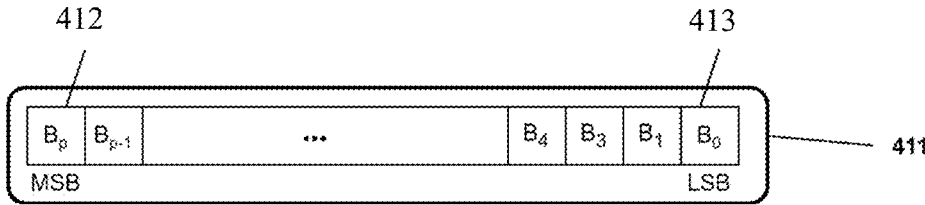
FIG. 4C is a schematic diagram of the arrangement of a single user-defined digital input or token in most significant bit mode first of the present invention.

Refer to FIG. 4C, which represents the digital inputs $X_n$ 411 in the most significant bit 412 (MSB) first mode. Similar to FIG. 4B, this figure depicts the digital sequence $X_n$ with a bit size 'p.' However, in the MSB-first mode, the bits are transmitted or processed starting from the most significant bit 512 and progressing towards the least significant bit 413.

Refer to FIG. 5A, this figure presents the specific helper data $X_n$ 511 in the LSB-first mode, MSB 512 indicated. The specific helper data $X_n$ 511 is associated with each digital input $X_n$ 411 and complements the entanglement and recovery process of specific root keys 600. Like the digital inputs $X_n$ 410, the specific helper data $X_n$ 510 can have any bit size 'q' and can be written or read in the LSB-first mode.

Figure 5B:
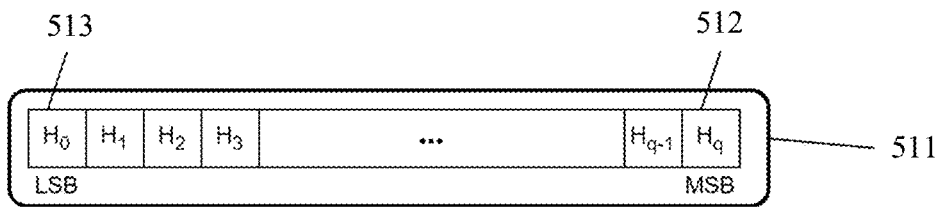
FIG. 5B is a schematic diagram of the arrangement of a single helper data section in least significant bit mode first of the present invention.
Figure 5C:
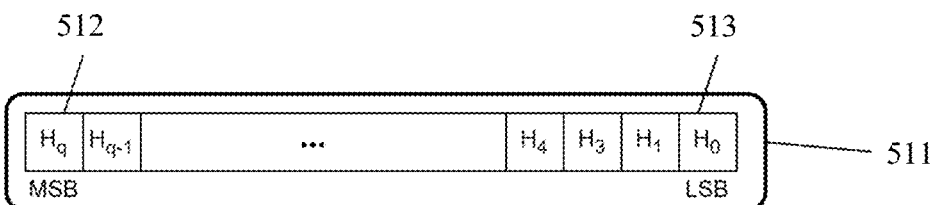
FIG. 5C is a schematic diagram of the arrangement of a single helper data section in most significant bit mode first of the present invention.

Refer to FIG. 5B and FIG. 5C, which showcases the specific helper data $X_n$ 511 in the MSB-first mode. The figure demonstrates the digital sequence $X_n$ for the helper data 510, with a bit size 'q.' In the MSB-first mode, the bits of the specific helper data $X_n$ 511 are transmitted or processed starting from the most significant bit 512 and progressing towards the least significant bit 513.

The bit size 'p' and 'q' from FIGS. 4B and 4C and FIGS. 5A and 5B and FIG. 5C can vary according to the specific implementation and requirements of the cryptographic system. Furthermore, the flexibility of being able to write or read the digital inputs $X_n$ 411 and specific helper data $X_n$ 511 in both the LSB-first and MSB-first modes enhances the versatility and compatibility of the system, allowing seamless integration with various applications and protocols, such as I2C, SPI and other bus and protocols.

Figure 6:
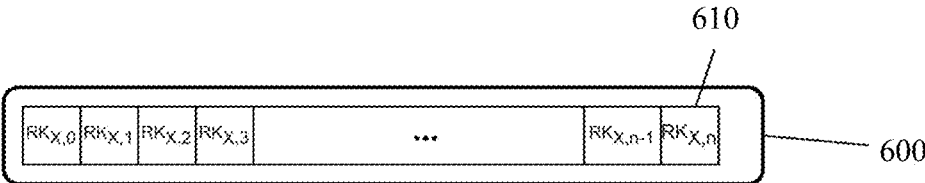
FIG. 6 is a schematic diagram of the structure of a single root key generated or recovered by the root key extractor designed in FIG. 3A the present invention.

Refer to FIG. 6, which depicts the root key X, indexed $RK_{x,j}$ each bit 610 and its associated with the sets of helper data 510 and set of digital inputs 410. Each root key X 600 is uniquely indexed and can have a variable length 'j' determined by the specific implementation requirements. The root key X 600 serves as a fundamental cryptographic key that forms the basis for secure operations within the system.

Associated with each root key X 600, there are corresponding the set of helper data 510 and digital inputs 410. The set of helper data 510 comprises non-volatile memory stored data that complements the entanglement and recovery process of the specific root key X 600. These helper data 510 entries are initially created by the root key extractor and are designed to be stored in either on-chip or off-chip non-volatile memory.

Similarly, the set of digital inputs 410 consists of arbitrary user-defined and/or self-generated digital data that can activate and contribute to the entanglement of the root key X 600. These digital inputs 411 can originate from various sources, such as user inputs, chip IDs, application-specific numbers, or local hardcoded memory. They can have any bit size and can be modified as needed to enhance the security and flexibility of the cryptographic system.

The association between each root key X 600 and its corresponding set of helper data 510 and digital inputs 410 allows for robust cryptographic operations, ensuring the integrity and confidentiality of sensitive data protected by root key X 600. By entangling the root key X 600 with the unique combinations of helper data 510 and digital inputs 410, the system achieves a high level of security and cryptographic strength while being able to interact more directly with the host application.

Figure 3B:
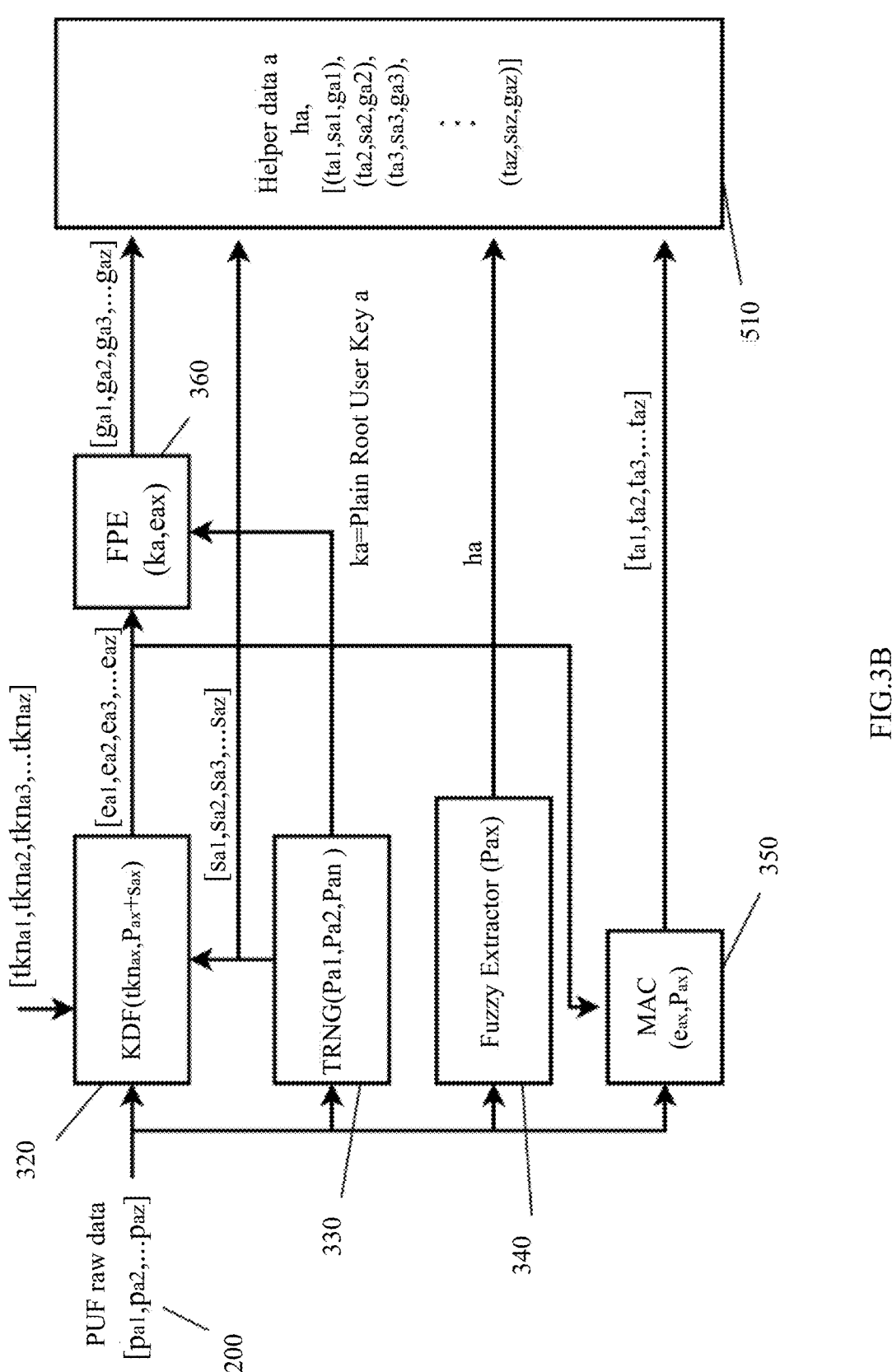
FIG. 3B is a schematic diagram of the procedure of root key enrollment of the system designed as in FIG. 3A with designated input, output and their relationship to the generated root keys.
Figure 3C:
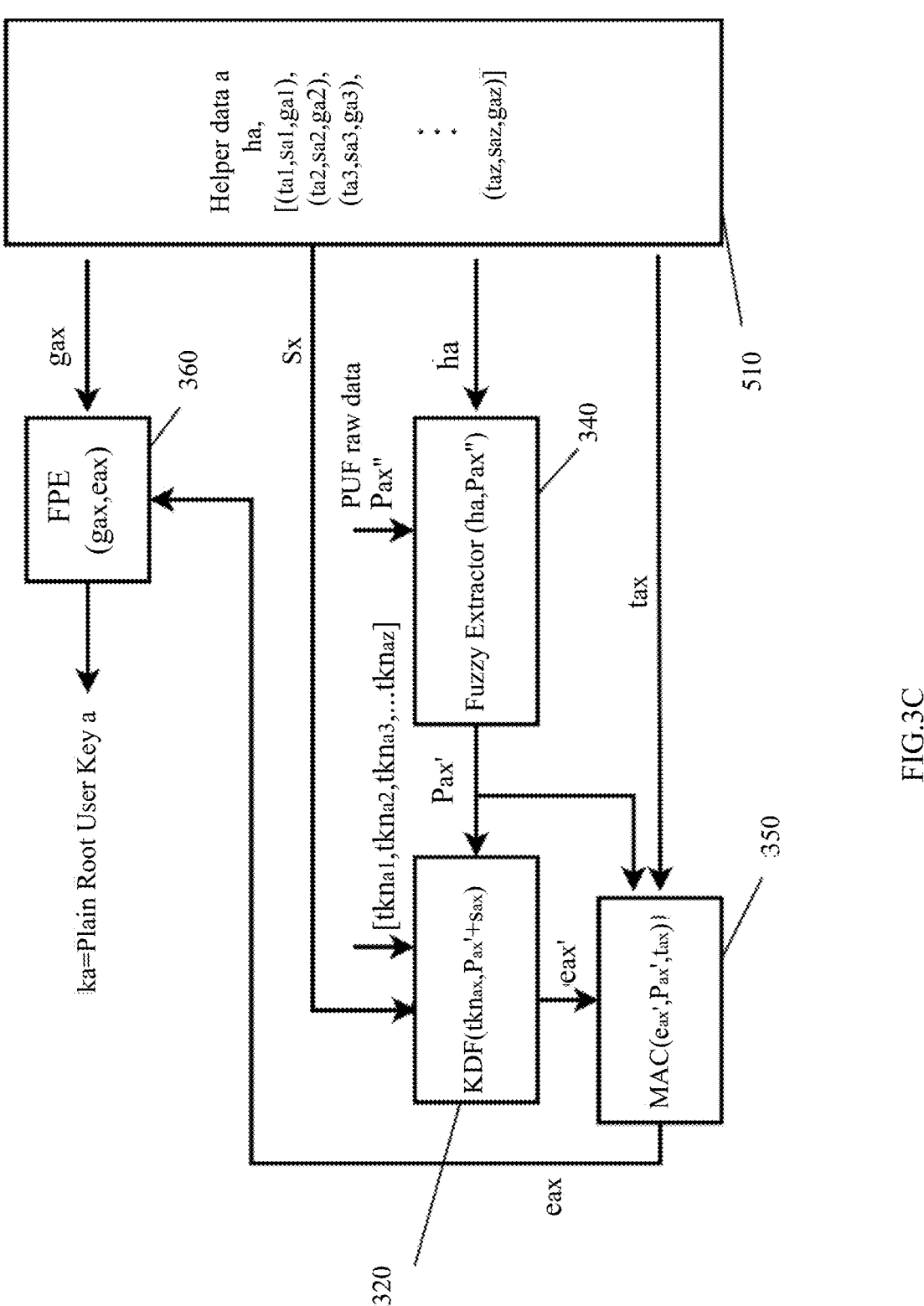
FIG. 3C is a schematic diagram of the procedure of root key recovery of the system designed as in FIG. 3A with designated input, output and their relationship to the recovered root keys.

Refer to FIGS. 3B and 3C, where the root key extractor 300 processing of enrollment, FIG. 3B, and recovery FIG. 3C, are presented more in detail with input and output data flows.

Refer to FIG. 3B, root key 600 enrollment procedure, where a certain number n of PUF raw data, referred as E in FIG. 2, and as $[P_{a1}, P_{a2}, \ldots P_{an}]$ in FIG. 3B, is used as one root key extractor 300 input, and where a corresponds to the specific helper data 511 index $X_n$, and where n in FIGS. 3B and 5A are unrelated. The n number of PUF raw data from 200 feed the input of KDF 320, TRNG 330, fuzzy extractor 340 and MAC 350, all the latest sub-systems requiring a variable number of PUF raw data input ranging between/and n.

The TRNG 330, uses a certain number n of PUF raw data and produces a certain number z of true random numbers for the helper data indexed a, referred in FIG. 3B as $[S_{a1}, S_{a2}, S_{a3}, \ldots S_{az}]$. The TRNG 330 uses a certain n of PUF raw data and produces the root key X 600, indexed a in FIG. 3B, in plaintext, referred as $k_a$.

The KDF 320, therefore, uses $[S_{a1}, S_{a2}, S_{a3}, \ldots S_{az}]$ as input from the TRNG 330, as well as a digital input 411 referred in FIG. 3B, and as $[tkn_{az}, tkn_{az}, tkn_{az}, \ldots tkn_{az}]$ in FIG. 3B, and where $tkn_{az}$ is the KDF 320 input key and the combination of PUF raw data input $P_{ax}$ and random number $S_{ax}$, with x ranging between/and z, is the KDF 320 input data. The KDF 320 produce, based on its inputs, an output binary sequence referred as $[e_{a1}, e_{a2}, e_{a3}, \ldots e_{az}]$.

The FPE 360, therefore, takes $[e_{a1}, e_{a2}, e_{a3}, \ldots e_{az}]$ and $k_a$ as input to perform format preserving encryption using $[e_{a1}, e_{a2}, e_{a3}, \ldots e_{az}]$ as input key and $k_a$ as input data, to produce $[g_{a1}, g_{a2}, g_{a3}, \ldots g_{az}]$. The produced values by FPE 360 are saved in the Helper data a.

The fuzzy extractor 340 uses a PUF raw data input, indexed x, denoted as $P_{ax}$, as it can be any version from the vectors array $[P_{a1}, P_{a2}, \ldots P_{an}]$ but the same version used for KDF 320 during enrollment, and produce a discrete extracted vector $h_a$, that is mathematically the only helper data for recovery process, other specific helper data 511 values composing, $(t_{az}, s_{az}, g_{az})$, being encrypted data to be decrypted during the recovery process using $h_a$, PUF input source 200, digital input 411 also referred as Token $[tkn_{az}, tkn_{az}, tkn_{az}, \ldots tkn_{az}]$, and the present system invention.

The MAC 350 uses the KDF 320 output $e_{ax}$ as well as the same version Px of the PUF raw data used by the fuzzy extractor 340 during enrollment, and produce a message authentication code $t_{az}$, denoted $[t_{a1}, t_{a2}, \ldots t_{az}]$, saved in specific helper data 511 as one component in addition to $[g_{a1}, g_{a2}, g_{a3}, \ldots g_{az}]$, $[S_{a1}, S_{a2}, S_{a3}, \ldots S_{az}]$ and $h_a$.

A set of helper data 510 for a single root key 600 is therefore composed of $h_a$, common to all digital inputs 410 recovering the same root key 600, and of as much $(t_{az}, s_{az}, g_{az})$ set as there are entangled valid digital inputs 411 within the set of digital inputs 410, referred in FIGS. 3B and 3C as $[tkn_{az}, tkn_{az}, tkn_{az}, \ldots tkn_{az}]$.

The vector $h_a$ is related to the root key 600 and each version of taz, saz, gaz related to the entanglement with the digital inputs 411, $[tkn_{az}, tkn_{az}, tkn_{az}, \ldots tkn_{az}]$.

Refer to FIG. 3C, root key 600 recovery procedure, where a different version than for the enrollment procedure of the PUF raw data $P_{ax}$ is collected from the PUF input source 200, denoted as $P_{ax}''$ when being a raw input, to be provided as input to the fuzzy extractor 340. The fuzzy extractor 340, during the recovery process of root key 600 load the vector $h_a$ and combined with the $P_{ax}''$ input produces a corrected version of $P_{ax}''$ denoted as $P_{ax}'$. The KDF 320, therefore, using the vectors $S_{ax}$ from the specific helper data 511, the same digital input 411, or $tkn_{az}$ used to create or used to be entangled with root key a, and the output of fuzzy extractor 340, produces a vector $e_{ax}'$. The KDF 320 uses $tkn_{az}$ as input key and combine $P_{ax}'$ and $S_{ax}$ as input data to feed the MAC unit 350 with its output $e_{ax}'$. The MAC 350, therefore, takes $e_{ax}'$, $P_{ax}'$, and tax from specific helper data 511 to validate $e_{ax}'$ as valid $e_{ax}$ for the decryption of $g_{ax}$ by FPE 360 that can effectively recover root key a, $k_a$, by decrypting $g_{ax}$ with the validated $e_{ax}$ as input key.

The values $e_{ax}'$ and $p_{ax}'$ referred in FIG. 3C, shall be identical to the $e_{ax}$ and $p_{ax}$ values used during the enrollment procedure in FIG. 3B, to expect a successful decryption of $g_{ax}$ by $e_{ax}$ in FPE 360. Should the values of $e_{ax}'$ and $e_{ax}$ be different between enrollment and recovery procedures, the cause will be either an incorrect digital input 411, $tkn_{az}$ or/and a PUF raw data measurement $p_{ax}''$ that exhibits too much bit differences and instability compared to its counterpart during the enrollment, hence the importance of assuming and having a PUF source that matches with expected static and dynamic entropy including bit errors. If the recovery procedure fails, the root key extractor 310 from FIG. 3A output an error message.

Figure 3D:
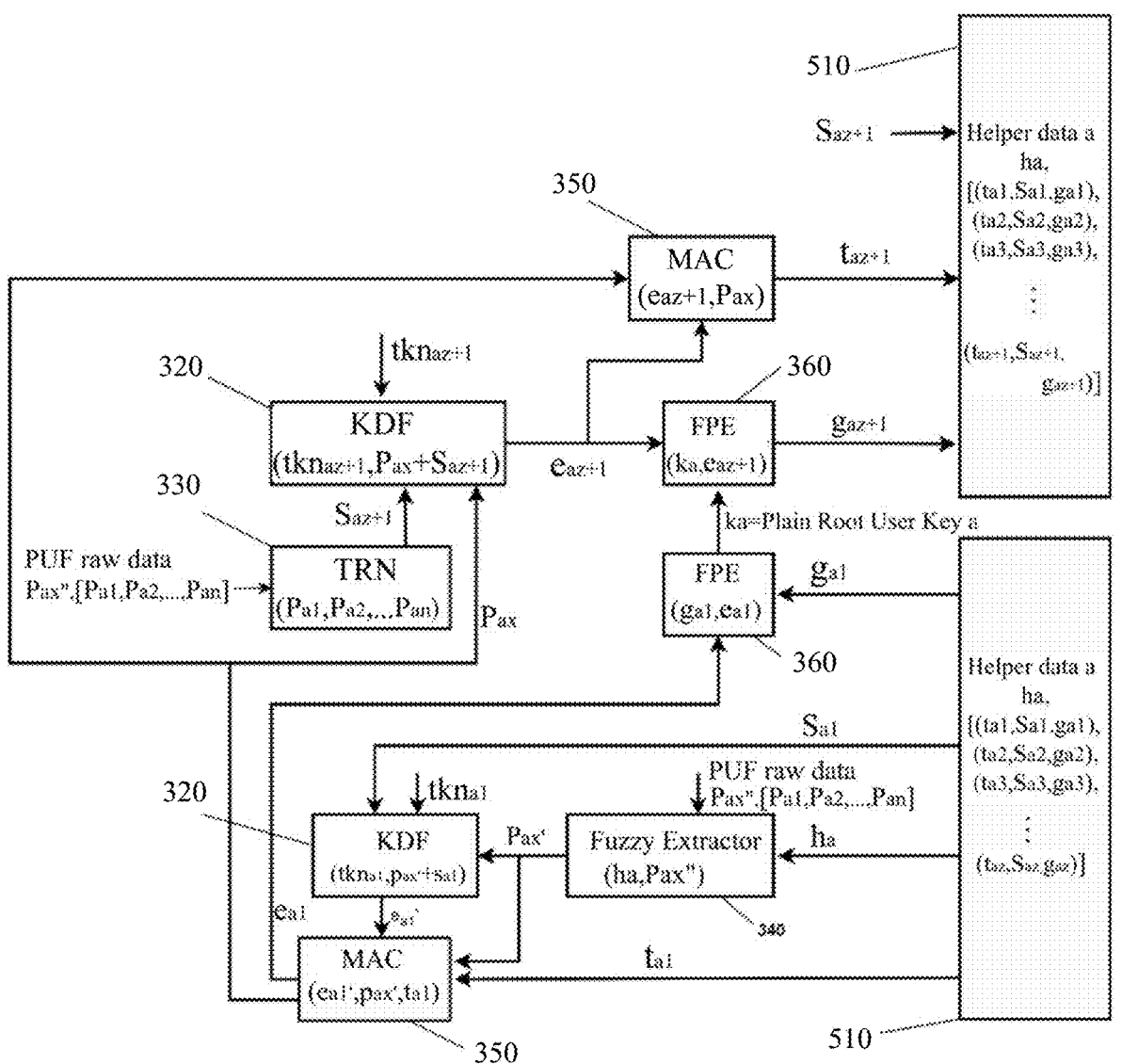
FIG. 3D is a schematic diagram of the procedure of root key update of the system designed as in FIG. 3A with designated input, output and their relationship to the recovered root key.

Refer to FIG. 3D, root key extractor 300 update procedure, where a new digital input token 411 is added as a valid input to recover a particular root key 600 based on using another section of helper data indexed az and the new desired digital input token 411 to entangle the target root key with convergence. The process starts by recovering the root key using an already valid digital input 411 and associated specific helper data 511, denoted as $tkn_{a1}$, $ta_1$, $sa_1$ and $h_a$, where $tkn_{a1}$, $ta_1$, $sa_1$ are not necessarily the first set created but in fact any valid previously valid set, written as $a_1$ on FIG. 3D for the simplification purpose of explanations as z and z+1 are in fact not necessarily consecutive indexes. The process of adding a new digital input 411, denoted as $tkn_{az+1}$ to a target root key 600 starts the exact same way as described in FIG. 3C for the recovery process, hence needing a valid other $tkn_{az}$ input. In order to pursue the flow and add a new $tkn_{az+1}$, the obtained $e_{az}$ by MAC 350, denoted as $e_{a1}$ in FIG. 3D for the example, is used to decrypt $k_a$ from $g_{az}$ read from helper data, and just as for the enrollment procedure described in FIG. 3B, $k_a$ can be encrypted using a new version of e, denoted as $e_{az+1}$, into $g_{az+1}$ to be saved in a new section of Helper data associated with the new digital input 411 desired to be added to list of valid inputs $tkn_{az+1}$. The new $e_{az+1}$, $s_{az+1}$ and $t_{az+1}$ are obtained identically to the enrollment process described in FIG. 3B, but in FIG. 3D added after the recovery procedure.

Overall FIG. 3D describes the combination of recovery and re-enrollment so as to add as much new valid digital input 411 associated with new specific helper data 511 into a set of helper data 510 for a specific root key 600.

Example of Intended Use: Secure and Versatile Electronic Device with Dynamic PUF-Based Root Key System In this example of intended use, we consider an electronic device powered by a microcontroller unit (MCU) that incorporates the present invention. The purpose of this system is to enhance the security and integrity of various critical functionalities within the electronic device.

Secure Boot (Root Key 1): The first root key, Root Key 1, is dedicated to secure boot operations. It ensures the authenticity and integrity of the device's firmware during the boot-up process. The MCU uses Root Key 1 to validate the firmware's digital signature, ensuring that only trusted and authorized firmware is executed, mitigating the risk of unauthorized modifications or malicious code injection. Additionally, Root Key 1 assists in creating a digital input required for recovering Root Key 2. This ensures that the Root Key 2 remains recoverable even in the event of a device reset or power loss, maintaining the continuity of secure firmware update operations that it is in charge of. The Root Key 1 may be associated with two set of digital inputs and helper data corresponding to Admin and user allowed permission to boot the device.

Secure Firmware Update (Root Key 2): Root Key 2 is specifically assigned for secure firmware updates. It is used to authenticate and verify the integrity of firmware updates received by the electronic device. The MCU verifies the digital signature of the firmware update using Root Key 2 before applying the update. This process guarantees that only authorized and untampered firmware is installed, protecting against potential security vulnerabilities. In that case of Root Key 2 management, only the Digital input of the Admin can be reuse as Digital input able to activate the Root Key 2 and perform firmware updates.

System Application (Root Key 3): Root Key 3 is utilized for securing system-level applications within the electronic device. This Root Key 3 is unique as it takes a digital input directly from the end-user, similar to a password. The user provides a specific digital input, such as a cryptographic key, PIN, or passphrase, which is used to activate and entangled with Root Key 3. This personalized input adds an additional layer of security, ensuring that the system application can only be accessed and operated by authorized users.

Subsystem and Application-Specific Root Keys (Root Key 4, Root Key 5, and more.):

The dynamic and multiple root key system entangled with various digital input sources can be extended to accommodate different subsystems and applications within the electronic device. Root Key 4, Root Key 5, and so on, are assigned for specific subsystems or applications, enabling isolated and secure channels for each functionality. These root keys, generated using their respective input data, ensure that the cryptographic services module associated with each subsystem or application operates with highly secure and independent root keys. This isolation prevents any potential compromise or unauthorized access from affecting other subsystems or applications, bolstering the overall security of the electronic device.

By employing the present invention within the MCU of the IoT device, a robust security architecture is established. This architecture enables secure booting, authenticated firmware updates, secure system applications, and isolated subsystems, all leveraging the cryptographic services module and highly secure root keys, while allowing for external digital inputs entanglement so as to bring the high security feature of PUF technology closer to applications security and not completely restricted to intrinsic entanglement, which in some case can simplify security designs and reduce power consumption, although not always desirable, hence these external digital inputs being optional.

As mentioned above, the present invention introduces a system for entangling multiple root keys and generating true random numbers using a physically unclonable function (PUF) and a proposed digital algorithmic system. The invention provides advantages over existing PUF technologies, including the ability to create and recover multiple true random root keys and true random numbers independent from power cycles. These features enhance security, enable the establishment of isolated secure channels, and offer flexibility in key management throughout the device lifecycle. The invention is compatible with existing electronic devices and can be integrated with minimal design modifications. The disclosed invention's ability to establish secure communication channels, generate true random numbers, and provide unique intrinsic digital identities paves the way for a new era of secure interactions.

What is claimed is:

1. An electronic system to create and recover a multitude of intrinsic unique digital sequences, comprising:

a physically unclonable function input source, designed to output a different bit stream PUF Raw Data after each different measurement requests that is capable of being requested independently from power cycle at any given time;

a root key extractor that is configured to produce both root keys and associated digital helper data in an enrollment mode, add new associated digital helper data in accordance with new user input to entangle a root key with the new user input in an update mode, and recover the produced root keys using adequate valid inputs and PUF raw data;

a set of cryptographic digital inputs that is capable of being established through various sources, stored or volatile, and corresponding to a certain bit length of digital sequences, accessed by the root key extractor;

a set of helper data, each section associated with a particular root key and one or more arbitrary user-defined input, accessed by the root key extractor; and a cryptographic services module that is configured to use as input the root keys created or recovered by the root key extractor;

wherein the input of the root key extractor comprises:

a certain number of bit stream from a source of PUF raw data that is configured to generate true random numbers, and an original true random root key;

a digital input sequence from the set of arbitrary user-defined digital inputs, that is capable of taking any bit length and be from various sources;

a particular section of stored helper data generated during a root key enrollment process or updated during an update process and used as input during a root key recovery process or update process, entangled with a particular user-defined digital input;

a locally or externally stored specific helper data section.

2. The electronic system according to claim 1, wherein the root key extractor has locally access to one or more indexed non-volatile memory via standard serial and, or bus peripheral communication protocols.

3. The electronic system according to claim 1, wherein the root key extractor operates in the root key enrollment process without using any user-defined input but a system-defined hardcoded one, and create root key associated helper data indexed section in accessible non-volatile memory.

4. The electronic system according to claim 1, wherein the root key extractor operates in a root key recovery mode using a user-defined input, and create root key associated helper data indexed section in accessible non-volatile memory.

5. The electronic system according to claim 1, wherein the root key extractor operates in root key update mode using a user-defined input, and append new a chunk of recovery data to the root key associated helper data indexed section in accessible non-volatile memory.

6. The electronic system according to claim 1, wherein the root key extractor operates in any mode associated with a root key and obtained raw data from a different physically unclonable function than the one that have been used for one other and many other root key extractor operation modes.

7. A root key extractor, to extract several unique intrinsic digital root keys with several non-random and random digital inputs, and producing both digital outputs and its own digital inputs helper data, the root key extractor comprising:

a key extractor controller that is a digital circuit in charge of managing a system input and output message, as well as controlling the sequence and operation flow of data between each unit composing the root key extractor;

a key derivation function unit that is configured to produce a unique random key used to encrypt a specific root key generated by a true random number generator during a root key enrollment process, and takes as input a user-defined digital input, true random numbers and a discrete measured version of the PUF source data, different at each measurement;

the true random number generator that is configured to use a certain number of input from the PUF source and produce as much true random numbers as required by the system, generating original root keys and creating random vectors used in helper data for root key recovery process;

a fuzzy extractor that is capable of producing a specific vector from a version of PUF raw data during the root key enrollment process, and use the latest specific vector to correct a new version of PUF source data into the initial one measured and used during the root key enrollment process to create a root key;

a message authentication code unit that generates vectors that serve to validate a certain key based on a certain bit stream value from the PUF source, the bit stream from the PUF source coming directly from the PUF Source during root key enrollment process, and coming from the fuzzy extractor correction mechanism during the root key recovery process;

a format preserving encryption unit that is configured to be used a symmetrical encryption and decryption unit, encrypting the root key in helper data during the root key enrollment process and decrypting the root key for output after validation of successful recovery by the message authentication code unit; and a memory storage for accessing a set of helper data that is configured to be used in writing operation mode during the root key enrollment process and in reading in recovery mode, wherein it stored digital values created by the fuzzy extractor, format preserving encryption unit, the true random number generator and message authentication code unit;

wherein the root key extractor operates in an enrollment mode to generate a root key based on inputs;

wherein, in a recovery mode, the system operates to recover the generated root key based on identical predictable digital inputs and different unpredictable digital inputs from a PUF source with certain amount of bit variations;

wherein, in an update mode, which is a combination of the enrollment mode and the recovery mode, the system operates to add additional root key digital input entanglement.

8. The key extractor according to claim 7, wherein the key extractor controller operates in the root key enrollment process using user-defined input when defined and random bit data from a physically unclonable source to generate a random root key and associated helper data.

9. The key extractor according to claim 7, wherein the key extractor controller operates in a root key recovery mode using identical user-defined input as the one used for target root key, associated helper data created during the enrollment mode, and random bit data from physically unclonable source.

10. The key extractor according to claim 7, wherein the key extractor controller operates in Root Key update mode using an additional user-defined input, random bit data from a physically unclonable source, associated helper data, and append new chunk of recovery data to the associated root key helper data section to include the new user-defined input as authorized digital input to launch successful recovery of the same root key.

* * * * *